March 2, 1971   S. T. HENRIKSSON   3,567,379
METHOD AND APPARATUS FOR PRODUCING METALLIC ARSENIC
Filed Nov. 1, 1968
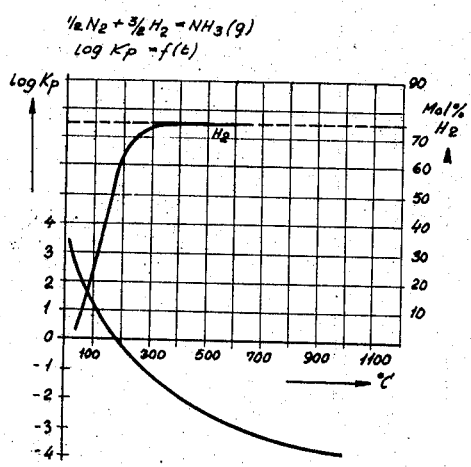
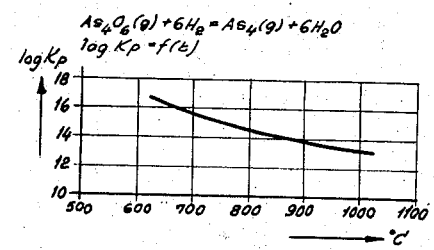
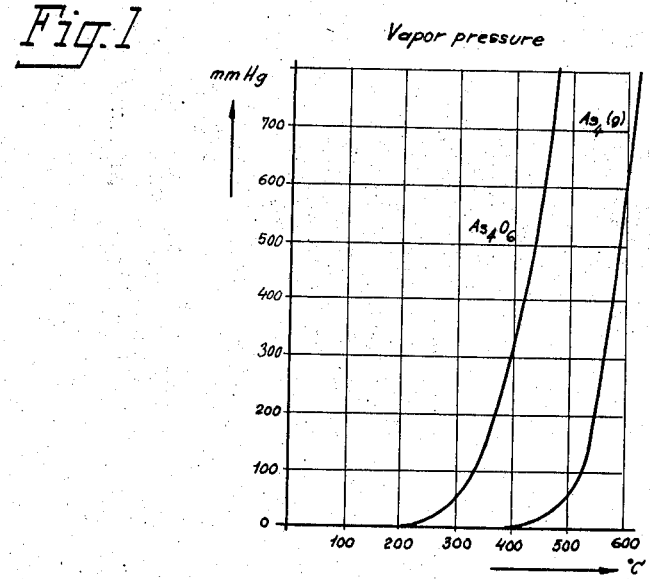
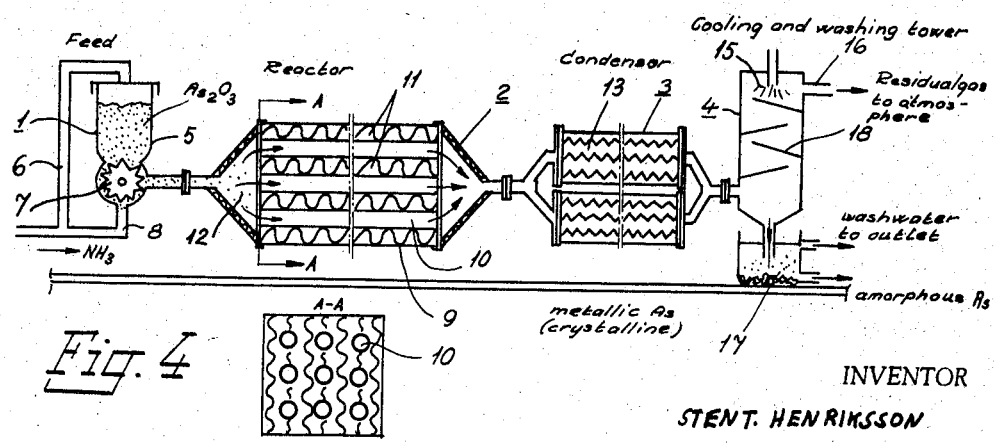
INVENTOR
STEN T. HENRIKSSON
BY Stevens, Davis, Miller & Mosher
ATTORNEYS

United States Patent Office 3,567,379
Patented Mar. 2, 1971

3,567,379
METHOD AND APPARATUS FOR PRODUCING METALLIC ARSENIC
Sten Tycho Henriksson, Skelleftehamn, Sweden, assignor to Boliden Aktiebolag, Stockholm, Sweden
Filed Nov. 1, 1968, Ser. No. 772,771
Claims priority, application Sweden, Nov. 10, 1967, 15,469/67
Int. Cl. C22b *33/00*
U.S. Cl. 23—209      7 Claims

ABSTRACT OF THE DISCLOSURE

Method and apparatus for producing metallic arsenic by reducing an arsenic compound in gas phase with ammonia. The method comprises suspending arsenic troxide in a stream of ammonia at a temperature which causes decomposition of the ammonia by the arsenic trioxide and wherein the formed hydrogen reduces the arsenic trioxide to elementary arsenic in a homogeneous gas phase reaction, whereafter the gas mixture is cooled and the arsenic vapour condensed out to crystallinic arsenic.

The apparatus comprises a feed means from which a finely divided arsenic compound distributed in a stream of ammonia is metered to a reactor, where said stream is homogenized by vaporisation of the arsenic compound, a condenser for condensing formed arsenic in elementary crystallinic form, and a gas cleaning tower in which the gas is cleansed of residual arsenic.

---

The invention is concerned with a novel method for producing crystalline arsenic by reduction of an arsenic compound in gas phase with ammonia, and an apparatus for putting the method into effect.

Metallic arsenic can be produced in a variety of ways, for instance by electro-chemical processes, by thermal decomposition of arsenic compounds in gas phase and by different reduction processes.

It is previously known to reduce an arsenic compound in gas phase. The arsenic compound used may be a halogenide, such as $AsCl_3$, a sulphide such as $As_2S_3$, oxide $As_2O_3$, an arsenate, an arsenite or organic arsenic compounds. The reduction agent used may be hydrogen gas, carbon monoxide or mixtures thereof. A presentation of the different methods available is found in Gmelins Handbuch der anorganischen Chemie, 8th Edition, 1952, part 17, Arsen, pages 87–97. A common technical method is to reduce arsenic trioxide with carbon. The reaction is effected in a steel cylinder subsequent to heating arsenic trioxide and carbon. The metal condensates in a cooler portion of the cylinder. This method is found described in Chemical and Metallurgical Engineering 20, No. 23, pages 957–960 (1920).

Practical experience of said processes shows that they are encumbered with a number of disadvantages. For instance, these processes have been found to affect deleteriously the health of participating personnel and are accompanied by explosion risks. It is also a desire to effect the process more rapidly. Furthermore, arsenic vapor is highly corrosive, particularly when condensating to solid metallic form. The useful life of the apparatus is thereby shortened.

Consequently, there is a desire to provide a more resistive structural material and a process which involves the least possible attack by corrosion. This would also result in a purer arsenic. Arsenic reacts readily with the condensator surface material when condensing, particularly when condensing to the crystalline modification. If the material from which the condensator surface is made is a good quality high-alloyed steel impurities such as Fe, Ni, Co, Cr, Mo, Cu and Mn are readily incorporated into the arsenic. It is possible that the arsenic will react with the surface metal to form arsenides. Finally, it is desired to obtain as much as possible of the metal which condensates out in crystalline form (trigonal crystal form; density 5.7–5.8). In principle the metal condensates in two forms, namely amorphous and crystalline, but it is the crystalline arsenic which has the greatest utility in technical fields.

The present invention is concerned with an improved process and an apparatus adapted to effect said process. The process is characterized by a novel reaction, wherein an arsenic compound in homogeneous gas phase is reduced with hydrogen formed in situ by thermal splitting of ammonia. The reaction is effected in a special apparatus, in which a rapid continuous process is obtained. The invention also provides for a high yield of metallic arsenic in the desired crystalline form.

Arsenic trioxide is preferably used as the starting material since it is inexpensive and can be obtained commercially in a highly pure form, and leaves no other secondary products than water. As mentioned previously, however, other arsenic compounds can be used provided that they have a sufficient vapour pressure at reaction temperature. The invention, however, will in the following mainly be described with reference to the use of arsenic trioxide.

In the drawings:

FIGS. 1 and 2 show, respectively, the thermodynamic conditions for the reactions $(NH_3)gas \rightleftharpoons \frac{1}{2}N_2 + \frac{3}{2}H_2$ and $As_4O_6(gas) + 6H_2 \rightleftharpoons As_4(gas) + 6H_2O(gas)$;

FIG. 3 shows the vapor pressure of $As_4O_6$ and $As_4$ at different temperatures and FIG. 4 illustrates an apparatus for effecting the process.

The method is preferably effected by introducing the oxide in the form of a fine powder into a stream of ammonia. The velocity and turbulence of the gas stream shall be such that the grains of oxide are held floating in space and uniformly distributed. The mixture is heated rapidly to 500–1000° C. The oxide is subsequently quickly vaporized whilst, at the same time, the ammonia decomposes into hydrogen and nitrogen (is cracked). The liberated hydrogen then reduces the arsenic oxide, and elementary arsenic, nitrogen and steam are formed. The reaction proceeds as shown by the following equations:

$$NH_3(gas) \rightleftharpoons \tfrac{1}{2}N_2 + \tfrac{3}{2}H_2 \quad\quad (I)$$

$$As_4O_6(gas) + 6H_2 \rightleftharpoons As_4(gas) + 6H_2O(gas) \quad\quad (II)$$

The thermodynamic conditions for the reaction have been presented in FIGS. 1–3. In FIG. 1 log $Kp$ is given for the inverse reaction according to Equation I, i.e.

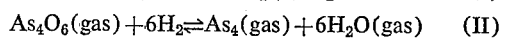

$$\log \frac{p_{NH_3}}{\sqrt{p_{N_2}} \cdot \sqrt{p_{H_2}^3}}$$

and mole percent $H_2$ in relation to the temperature. In FIG. 2 is shown the corresponding log $Kp$ for the reaction according to Equation II, i.e.

$$\log \frac{p_{As_4} \cdot p_{H_2O}^6}{p_{As_4O_6} \cdot p_{H_2}^6}$$

in relation to the temperature. FIG. 3 shows the vapour pressure for $As_4O_6$ and $As_4$ at different temperatures. At chemical equilibrium practically all arsenic exists as metal at the reaction temperature. Both the oxide and the arsenic have a significant vapour pressure (FIG. 3) at these temperatures. The reactions are rapid, since the use of ammonia gives a much more rapid reduction than both hydrogen gas and carbon monoxide. The reason for this is thought to be that hydrogen is formed in atomic form when the ammonia decomposes as in Equation 1; in which form hydrogen is very reactive. The hydrogen thus reacts instantly with the oxide, at the moment of forming, as shown in Equation 2. The chain reactions shown in Equations I and II when forming elementary arsenic thus proceed very rapidly. If the decomposition of ammonia in the reaction apparatus is measured and under the same conditions generally but in the absence of arsenic it will be observed that decomposition takes place much more slowly. The arsenic or oxide thus provide a certain catalytic effect. The partial pressure of hydrogen in the reactor becomes low owing to the reactivity of the hydrogen and its rapid conversion. As a practical estimate of the reaction speed it can be mentioned that when employing stoichiometric proportions or a slight ammonia excess the gaseous mixture need only be held within the temperature range of 700–1000° C. for about one minute to obtain complete reduction of the arsenic-trioxide to elementary arsenic. In the case of other conventional reduction agents, such as hydrogen and carbon monoxide the reaction time is considerably longer, in the order of one or more tens powers and result in a poorer yield.

The advantages gained by introducing the oxide in finely divided form into a rapidly moving stream of gas are that firstly it is possible to feed the starting substances into the reactor in a relatively simple manner and secondly that the said substances are obtained in a well balanced mixture subsequent to vaporization of the oxide. The reaction when forming elementary arsenic is slightly exothermic ($\Delta^H 1273°$ K.=$-32.4$ kcal./mol As$_4$). The heat balance for the process is therefore technically and economically favourable.

Upon termination of the reaction the gaseous mixture contains elementary arsenic, water, nitrogen and some ammonia (when an excess of ammonia has been used) and traces of hydrogen. It is impossible at the prevailing reaction conditions for arsenic hydride to be formed either in the reactor itself or outside the same. The gaseous mixture is then cooled to precipitate crystalline arsenic. In FIG. 3 the arsenic vapour pressure is shown as being low below 470° C., and it is necessary to lower the temperature of the gaseous mixture to this temperature. There are at least four different forms of elementary arsenic, of which three are X-ray amorphous and one X-ray active and crystalline. It is, of course, desirable to obtain the crystalline form. This is formed within the temperature range of 470° to about 250° C. and quickest at about 350–450° C. Condensation can be considered to be terminated at 200° C. The equilibrium vapour pressure is then $p_{As_4}=6.31 \cdot 10^{-4}$ mm. Hg. During the condensation period much longer stay times for the gas must be taken into consideration than in the reaction period itself. The losses can be kept very small even though the arsenic losses are higher in the departing gas than the loss corresponded by the equilibrium vapour pressure. As was mentioned in the introduction, condensating arsenic corrodes the condensor surfaces to form arsenides. This means that the arsenic adheres very strongly to the surfaces of the condenser and is very difficult to remove therefrom. For this reason the choice of condensator surface material is very much restricted and, in connection with the present invention, different types of glass such as boron silicate glass, quartz and the metal aluminium have been found to give the best results. The arsenic can readily be released from these, or loosens by itself upon cooling. The crystalline arsenic obtained in this way upon precipitation is highly pure and of the highest quality. The total content of impurities can be held to about 100 grams per ton (metallic arsenic 99.99%) with the use of common commercial products as starting material.

Subsequent to the condensation small quantities of arsenic remain in the gas, in finely-divided form and in solid phase, and some unreacted oxide. The gas is therefore cooled to normal temperature and is washed with water, whereupon remaining arsenic compounds, from which arsenic can be recovered together with ammonia, departs with the washing water. Subsequent to this the residual gas will only contain nitrogen and hydrogen. The content of hydrogen, however, is low at normal ammonia excess in the reaction. The residual gas is consequently safe, both from the point of view of explosion and with respect to toxicity, and can be released to atmosphere without risk. In the process of the invention the metal yield is more than 95%. Usually a certain excess of ammonia gives the best result, this excess preferably rising to about 10–20%; the reason for this being that the hydrogen pressure forms part of the denominator in the equilibrium Equation II.

The process according to the invention thus presents the following advantages in comparison with the conventional reduction agents hydrogen gas and carbon monoxide: the process is very rapid, results in a good yield and, as a result thereof, provides for high capacity in relatively small plants. Toxic and explosion risks are slight. As will be apparent from the following, the process can also to advantage be made continuous.

The invention is also concerned with an apparatus for carrying out the method. This apparatus, which is illustrated in FIG. 4, comprises a feed means 1, a reactor 2, a condenser 3 and a gas cooler tower 4. The feed means is in the form of a metering means and comprises a container 5, containing the arsenic compound used as starting material. The container is pressurized through the line 6. Positioned under the container is a conventional type of rotary vane feeder 7 adapted to feed out controlled quantities of the arsenic compound. Ammonia is passed to the rotary vane feeder 7 through line 8 which communicates with line 6 and an ammonia storage container (not shown). Instead of the rotary vane feeder 7 the feed means may be provided with some other type of conventional metering means, such as a conveyor screw. The arsenic compound is passed from the feed means suspended in ammonia to the reactor 2. The reactor comprises a container 9 in which are positioned tubes 10 made of quartz glass or passages formed with silica bricks. Other materials may also be used, but silica or quartz material is preferred since it is gas-proof, resistant to arsenic and withstands the high temperatures applied. The reactor is preferably heated by an electric resistant element 11. At the inlet side the container 9 is designed as a chamber 12 in which the arsenic compound is vaporized and the gaseous mixture homogenized. The temperature is preferably held within the chamber 12 in the region of 200–700° C. and in the reactor passages 10 within the region of 700–1000° C.

The reacted gas is passed from the reactor to the condenser 3, which includes cooled condenser surfaces 13.

These surfaces may comprise of glass, quartz or aluminium and be made in the form of vertical rods or tubes. When constructing the condenser attention must be paid to the relationship between the coefficient of linear expansion for arsenic and the material from which the condenser surfaces are made. The coefficient of linear expansion $$\frac{\Delta l}{1 l \, (\text{in} \, ° \text{C.})} \cdot 10^{-6}$$

is the following: As 3.9; Al 28.7; steel 15.0; quartz-glass 0.5; Pyrex-glass 3.3.

When condensating onto a convex surface, for instance the outer surface of a tube, the coefficient of expansion of the material composing said surface should be higher than that of arsenic so that the arsenic can be easily removed therefrom. Conversely when condensating onto a concave surface, for instance the inner surface of said tube, the coefficient of expansion of said material of said surface should be lower than that of arsenic. Temperature control, effected by some suitable means for accurately setting and regulating the temperature of condenser cooling surfaces, is of essential importance to enable the condensation of the crystalline arsenic to be regulated with respect to the precipitation velocity and particle size and shape. The arsenic is precipitated in metallic form as trigonal crysttls. The size of the crystals can be regulated by temperature control so that at higher temperatures, 470° C. and above, a fine crystalline condensate is obtained, while at lower temperatures a coarser crystalline structure is obtained. The condenser operates within the temperature range of 200–470° C. In a continuously operating plant two or more condensers are connected in parallel. These are used alternately, so that when one condenser is saturated it can be disconnected and an empty unit connected in its stead. It is important that the condenser is allowed to cool in a protective gas atmosphere before being opened. While the arsenic is hot it will oxidize readily in air. The protective gas may be the gaseous mixture itself or some special gas, such as nitrogen. When the condenser cools the arsenic loosens from the condenser surfaces and can easily be collected and packed, suitably in an air-tight container.

Subsequent to leaving the condenser the gas is passed to a cooling and washing apparatus 4 in the form of a tower, where the gas is cooled and washed. The fine particles of amorphous arsenic readily orientate themselves in the phase boundary surfaces between the air and water. Thus, there is provided in the gas cooler 4 obliquely inclined plates 18 provided with a film of water which absorbs the grains of arsenic, and between the plates are arranged water curtains. The gas is passed in countercurrent to a flow of water emerging from a spray 15. The washing liquid is collected beneath the gas washer 4 in a sedimentation tank 17, from which the amorphous arsenic can be recovered. The sedimentation process can be improved by adding to the liquid a settling agent such as Separan®, a water-soluble nonionic polymer of acrylamide. The cooling and washing means may also be combined with a wet electrofilter which captures the last traces of arsenic in the gas.

The temperature range in the washing and cooling tower is from about 200° C. at the start of the process and at the end of the process corresponds to the temperature of the washing water and the surroundings. The residual gas is essentially hydrogen and nitrogen, and is led away to atmosphere in some suitable manner, via a water trap and a line 16

The sedimented amorphous arsenic can be recovered while the washing water is led away to a suitable recipient.

EXAMPLE 130 kg. of arsenic trioxide and 4 kg. (55 m.³) ammonia per hour were passed to the apparatus shown in FIG. 4. The reactor was provided with 9 quartz tubes presenting a diameter of 200 mm. and a length of 2000–4000 mm. and the cooling surface in the condenser was 90 m.² and the temperature about 1000° C. A total of 100 kg. of arsenic was obtained per hour, the reduction degree being a total of 93–98%. About 90 kg. of crystalline arsenic and 3–8 kg. of amorphous arsenic were obtained, the remaining arsenic being entrained with the washing water. The residual gas from the washing tower contained 70% nitrogen and 30% hydrogen.

| | Impurities in gram per ton in— | |
|---|---|---|
| | $As_2O_3$ | Metallic arsenic in crystalline form |
| Ag | <1 | <0.1 |
| Al | 7 | 1 |
| Bi | 2 | 2 |
| Ca | 9 | 3 |
| Cd | <1 | <1 |
| Co | <1 | <1 |
| Cu | 5 | 2 |
| Mg | 3 | <1 |
| Mn | <1 | <1 |
| Na | 20 | <10 |
| Ni | <1 | 0.3 |
| Pb | 10 | 0.5 |
| Sb | 1,000 | 0.2 |
| Zn | 3 | 3 |
| Cr | <1 | <1 |
| Fe | 20 | 8 |
| Si | 50 | 10 |
| Sn | <1 | <0.3 |
| Te | <30 | <10 |

As can be seen from the table the product is refined to a certain extent during the production process so that the crystalline arsenic is considerably purer with regard to several impurities than the oxide starting material.

What is claimed is:

1. A process for continuously producing crystalline metallic arsenic, characterized in that arsenic trioxide is suspended in a stream of ammonia at 500–1000° C. wherein the ammonia is decomposed, at least partly catalytically, by the arsenic trioxide and the formed hydrogen reduces the arsenic trioxide to elementary arsenic in a homogenous gas phase reaction, whereafter the gas mixture is cooled and the arsenic vapour caused to condense out as crystalline arsenic.

2. A process according to claim 1, characterized in that ammonia is added in a stoichiometric excess of 10–20%.

3. A process according to claim 1, characterized in that the gaseous mixture is cooled by contact with a cooling surface to a temperature of 250–400° C., the crystalline arsenic condensing on the cooling surfaces.

4. A process according to claim 1, characterized in that subsequent to said condensation of crystalline arsenic the gas is cooled to a temperature below 100° C., by washing in a cooling and washing tower, wherein residual arsenic and arsenic trioxide are separated.

5. A process according to claim 2, characterized in that the gaseous mixture is cooled by contact with a cooling surface at a temperature of 250–400° C., the crystalline arsenic condensing on the cooling surface.

6. A process according to claim 2, characterized in that subsequent to said condensation of crystalline arsenic the gas is cooled to a temperature below 100° C. by washing in a cooling and washing tower, wherein residual arsenic and arsenic trioxide are separated.

7. A process according to claim 3, characterized in that subsequent to said condensation of crystalline arsenic the gas is cooled to a temperature below 100° C. by washing in a cooling and washing tower, wherein residual arsenic and arsenic trioxide are separated.

References Cited

UNITED STATES PATENTS 3,047,366    7/1962    Williams    23—209X
3,359,071    12/1967    Merkel et al.    23—209

FOREIGN PATENTS 1,017,782    1/1966    Great Britain    23—209

EARL C. THOMAS, Primary Examiner

U.S. Cl. X.R.

75—62